United States Patent [19]

Ohkubo et al.

[11] Patent Number: 4,671,642
[45] Date of Patent: Jun. 9, 1987

[54] IMAGE FORMING APPARATUS

[75] Inventors: Yukitoshi Ohkubo, Yokohama; Shuzo Kaneko, Tokyo; Junichiro Kanbe, Yokohama, all of Japan

[73] Assignee: Canon Kabushiki Kaisha, Tokyo, Japan

[21] Appl. No.: 726,825

[22] Filed: Apr. 24, 1985

[51] Int. Cl.$^4$ ............................................. G03G 21/00
[52] U.S. Cl. ................................... 355/3 R; 350/330; 355/11
[58] Field of Search ................. 355/3 R, 11; 350/330, 350/335, 352

[56] References Cited

U.S. PATENT DOCUMENTS

| 3,936,172 | 2/1976 | McVeigh | 355/3 R |
| 4,080,058 | 3/1978 | Stephany et al. | 355/3 R |
| 4,099,855 | 7/1978 | Wisbey et al. | 350/335 X |
| 4,110,794 | 8/1978 | Lester et al. | 355/3 R |
| 4,194,833 | 3/1980 | Lester et al. | 355/3 R |
| 4,448,867 | 5/1984 | Ohkubo et al. | 355/3 R |

*Primary Examiner*—R. L. Moses
*Attorney, Agent, or Firm*—Fitzpatrick, Cella, Harper & Scinto

[57] ABSTRACT

An image forming apparatus of the type comprising a liquid crystal panel having a first substrate having first electrodes thereon, a liquid crystal layer, a second substrate having a second electrode, polarizing means and light-scattering reflection means; a light source for emitting light toward the liquid crystal from the side of the first substrate; means for forming an electrostatic light image corresponding to the light rays reflected from the liquid crystal panel; and developing means. Picture elements are arranged in a row or column with a spacing (P) between adjacent picture elements, each picture element being formed at a portion where the first and second electrodes face each other through the liquid crystal layer, the gap (P) being equal to or larger than the distance (D) from the interface between the second electrode and the liquid crystal layer to the scattering reflection surface of the light-scattering reflection means.

17 Claims, 13 Drawing Figures

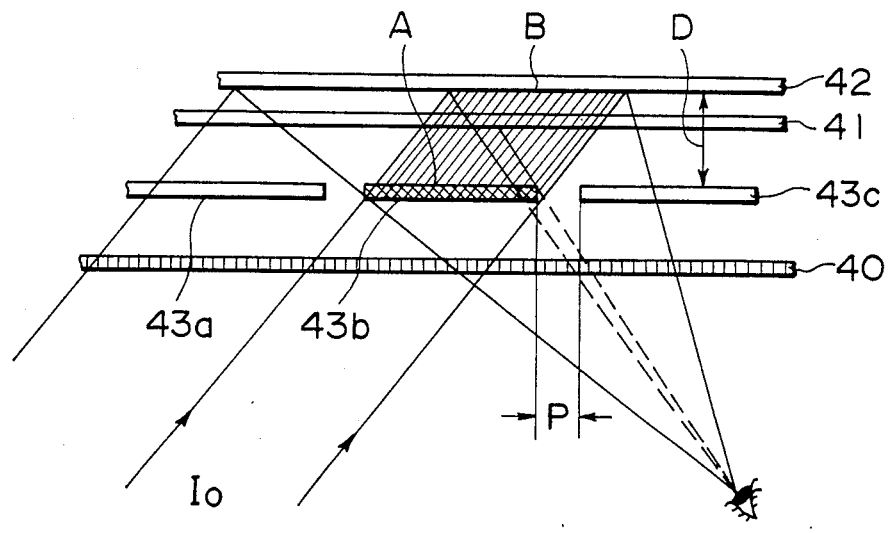
F I G. 4
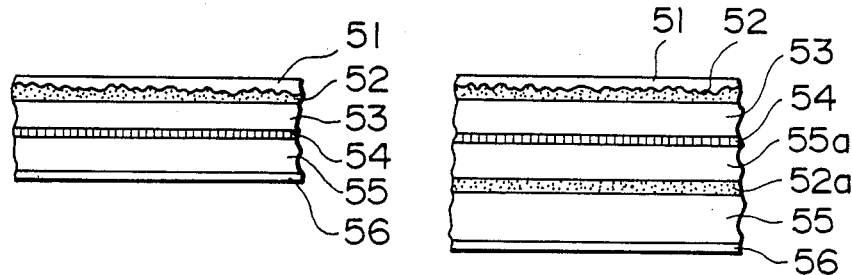
F I G. 5A    F I G. 5B

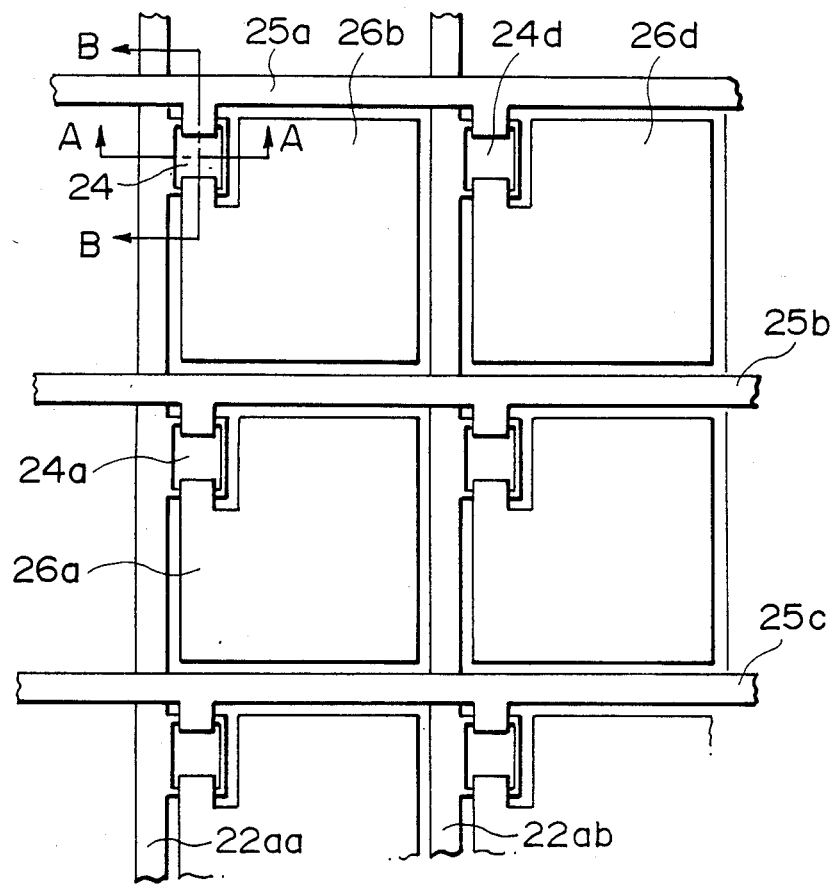
F I G. 7
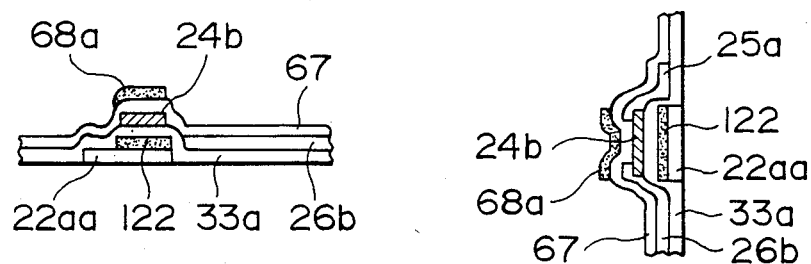
F I G. 8A   F I G. 8B

IMAGE FORMING APPARATUS

BACKGROUND OF THE INVENTION

The present invention relates to an image forming apparatus and more particularly to an image forming apparatus capable of not only giving display images but also formed an original to be copied by an electrophotographic process.

In the conventional image forming apparatus having the above-described capabilities, there has been used a liquid crystal panel with a simple matrix construction in which a large number of stripe electrodes are opposed in the horizontal and vertical directions and a liquid crystal is sandwiched therebetween. However, the liquid crystal panel of the type described has a defect that the amount of information to be displayed cannot be increased sufficiently because of the limits imposed on the operation of a liquid crystal. Meanwhile, as a means for increasing the amount of information to be displayed, there has been recently developed a device in which a thin film transistor (to be referred to as "TFT" hereinafter in this specification) is provided for each picture element and such TFTs are arranged into a matrix array. However, the increase in amount of information to be displayed means the reduction in size of picture elements in the case of an image forming apparatus with a predetermined display picture area. When this is used as a reflection type, there is a defect that a double image or two separated picture element images are formed by an image forming part of a liquid crystal layer produced by optical changes and by a shadow part formed by the projection of an optically changing part upon a light scattering reflection surface by an external illumination.

Furthermore, when a reflection optical system is used to display and to impart a light image to an electrophotographic printer by utilizing such a liquid crystal panel, there is a defect that such a metal forming electrodes gives to a reflecting plate a shadow which lowers a display potential. No scattered light rays are emitted from this metal electrode so that there is a defect that a black part is printed on a copied recording medium. Furthermore, when such a liquid panel is used as a display panel, such metal electrodes function as a reflecting surface, making it difficult to view a display.

SUMMARY OF THE INVENTION

A primary object of the present invention is to provide a high quality image forming apparatus which can substantially eliminate the above-described defects of the conventional image forming apparatus and which has a wide angle of view and a high contrast.

Another object of the present invention is to provide an image forming apparatus which has the above-described functions and which is thin and inexpensive.

A further object of the present invention is to provide a thin-film-transistor-driven liquid crystal image forming apparatus which gives an easy-to-see display screen in itself as a display panel and which has satisfactory functions as an original to be copied.

According to the present invention, there is provided an image forming apparatus of the type comprising a liquid crystal panel having a first substrate having first electrodes thereon, a liquid crystal layer, a second substrate having a second electrode, polarizing means and light-scattering reflection means; a light source for emitting light toward the liquid crystal from the side of the first substrate; means for forming an electrostatic light image corresponding to the light rays reflected from the liquid crystal panel; and developing means picture elements are arranged in a row or column with a spacing (P) between adjacent picture elements, each picture element being formed at a portion where the first and second electrodes face each other through the liquid crystal layer, the gap (P) being equal to or larger than the distance (D) from the interface between the second electrode and the liquid crystal layer to the scattering reflection surface of the light-scattering reflection means.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 4 is a schematic sectional view used to explain a blur of a reflected image around an opposing substrate;

FIGS. 5A and 5B are sectional views of examples of preferred opposing laminated substrate structures used in the present invention;

FIG. 7 is a plan view of another embodiment of a TFT substrate; FIG. 8A is a sectional view taken along the line A—A of FIG. 7; FIG. 8B is a sectional view taken along the line B—B of FIG. 7.

DESCRIPTION OF THE PREFERRED EMBODIMENTS

Figure 1A:
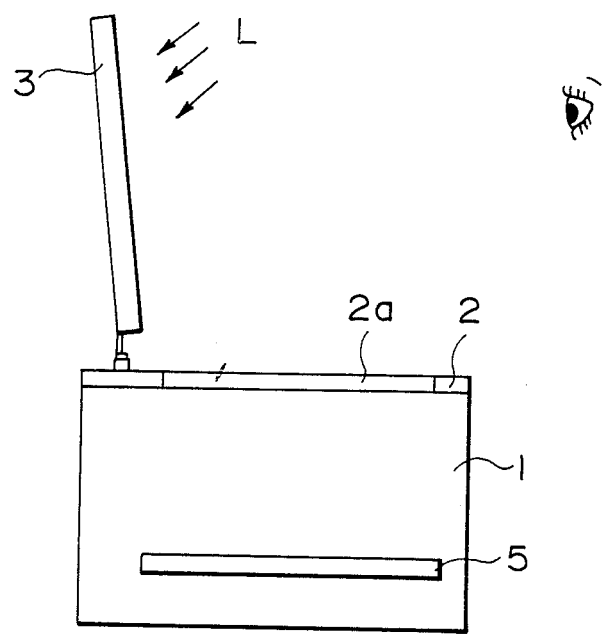
FIG. 1A side view of a display and copy device system including an image forming apparatus (liquid crystal panel) according to the present invention in the display mode.
Figure 1B:
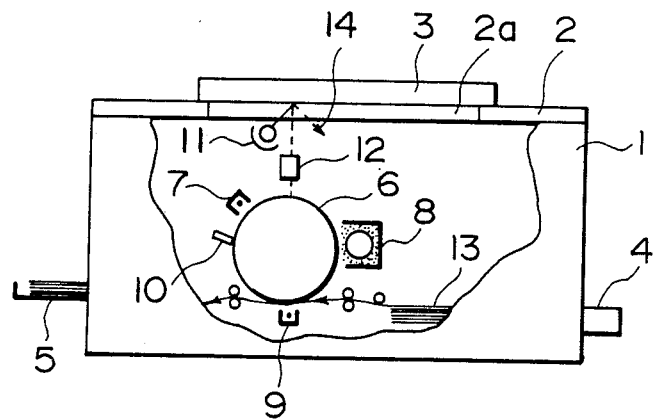
FIG. 1B is a front view, partly broken, thereof in the copying mode.

A fundamental construction of a device system in which an image forming apparatus (liquid crystal panel) in accordance with the present invention is used as a display device or as a master or original of an electrophotographic printer will be described. FIG. 1A is a side view of the device system in the display state and FIG. 1B is a front view, partly broken, thereof in the copying or printing mode.

Referring now to FIG. 1, an original table 2 is disposed at the top of an ordinary printer main body 1 and at least a surface 2a incontact with an original (to be referred to as "an original-contact surface" hereinafter in this specification) is made of a transparent material such as glass. A panel 3 in accordance with the present invention is swingably attached to the original table 2. When the panel 3 is raised upright as shown in FIG. 1A, it may be used as a display device. That is, like a conventional liquid crystal display device, the panel 3 can effect a reflection type display in response to environmental light rays L or by providing a separate light source. On the other hand, when a hard copy of an image displayed on the panel 3 is desired, the display panel 3 is turned over the original-contact surface 2a of the original table 2 so that the image displayed on the panel 3 is copied just like an ordinary original or master. In FIG. 1, reference numeral 4 denotes a copy paper cassette; 5, a discharge tray; 13, copy paper; 6–13, members of a conventional electrophotographic printer. More specifically reference numeral 6 denotes a photosensitive drum; 7, a charging device; 8, a developing device; 9, an image-transfer charging device; 10, a cleaner; 11, a lamp for illuminating an original; and 12, a Selfoc (trademark) lens array.

The original stand 2 may be of the movable type or of the stationary type, but the panel 3 must be fixed to the original-contact surface 2a. Especially for the purpose of simple illustration, FIG. 1B shows a movable original table 2, but in the case of a stationary type original table, an original-illumination light source and a drum exposure optical system (combination of the members 11 and 12 in this embodiment) are designed and constructed as a movable optical system.

In the optical system of the type described, an optical system is so designed and constructed that when an ordinary original in the form of a sheet, a book or the like is illuminated by the illumination lamp 11, the Selfoc lens 12 is disposed so as not to receive the light rays (indicated by 14 in FIG. 1B) reflected back from the original in a specular reflection mode. This is because, when the light rays specularly reflected back from the original enter the Selfoc lens 12, the light rays reflected back from the original table itself also enter the Selfoc lens 12 so that a sufficiently high quality copy image cannot be obtained. In other words, only the light rays scattered and reflected by the surface of the original must be focused upon the drum 6.

Next, the construction of the panel 3 used in the present invention will be described.

Figure 2:
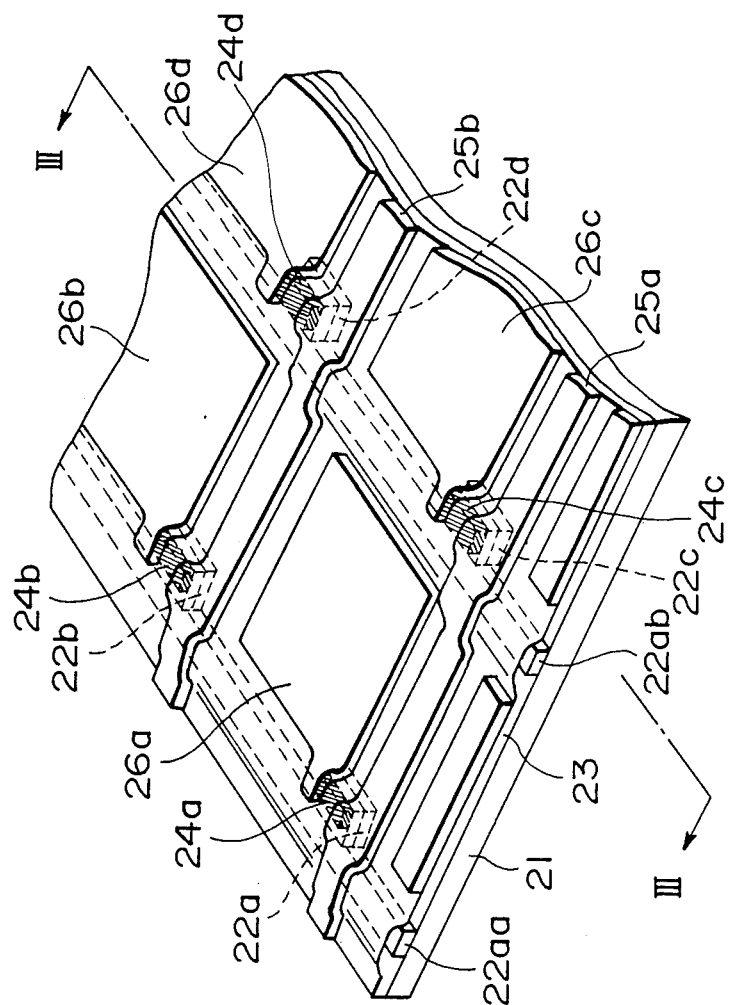
FIG. 2 is a perspective view of a substrate having a semiconductor driving circuit on which TFTs forming component parts of a panel are arranged in a matrix array.
Figure 3:
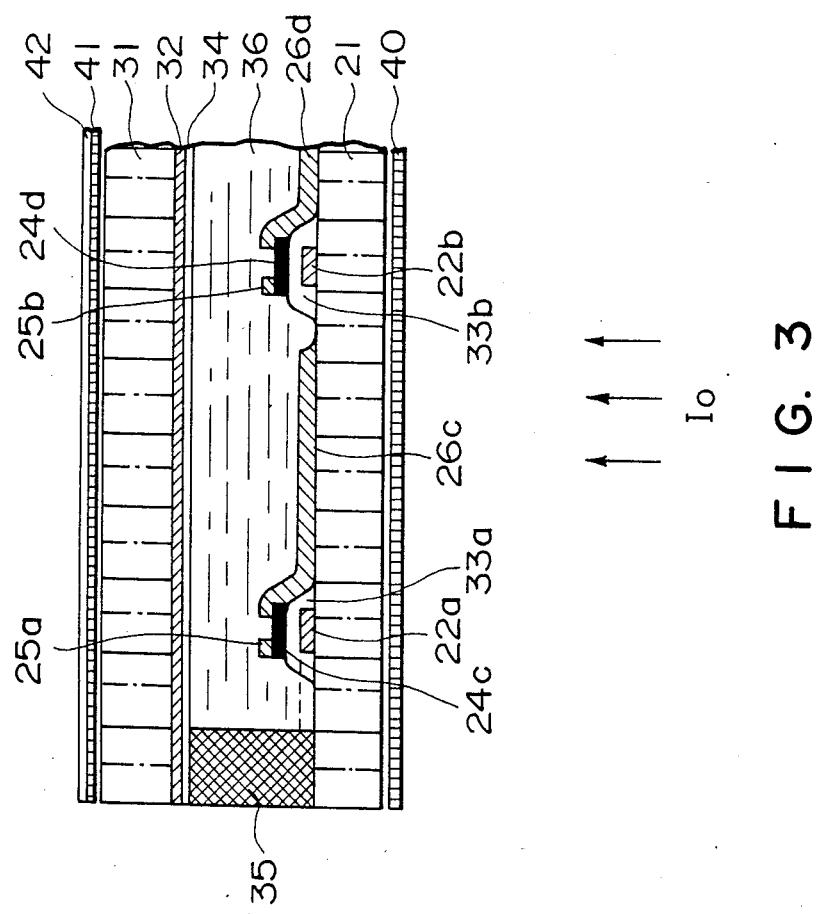
FIGS. 3, 6 and 10 are, respectively, partial sectional views taken in the direction of the thickness of a liquid crystal panel constructed by the electrode plate shown in FIG. 2 and an opposing substrate.

FIG. 2 is a perspective view of a substrate with a semiconductor driving circuit comprising a matrix array of thin film transistors (to be referred to as "TFT" hereinafter in this specification) each of which is a member constituting a panel. FIG. 3 is a partial sectional view of a liquid crystal display panel incorporating the substrate shown in FIG. 2. The substrate as shown in FIG. 2 is a substrate 21 of glass or the like which constitutes a display panel and over which is disposed a matrix array of driving TFTs at a density of the order of 2–10 lines/mm. The TFTs have gate lines 22aa and 22ab (transparent or metal thin conduction films) formed over one major surface of the substrate 21 and gate electrodes 22a, 22b, 22c and 22d formed over the gate lines 22aa and 22ab. At least the gate electrodes comprise an opaque or light shielding electrode made of Al, Mo, Cr or the like. The TFTs further comprise thin semiconductor films 24a, 24b, 24c and 24d formed through insulating films 23 over the gate electrodes 22a, 22b, 22c and 22d, respectively; source lines (conduction films) 25a and 25b respectively connected to one end of the thin semiconductor films 24a, 24b, 24c and 24d; and drain electrodes 26a, 26b, 26c and 26d connected to the other ends of the thin semiconductor films 24a, 24b, 24c and 24d, respectively.

FIG. 3 shows a liquid crystal panel comprising the electrode plate as shown in FIG. 2 and an opposing substrate. In FIG. 3 reference numerals, 31 and 32 denote transparent substrates made of glass, plastic or the like; 26c and 26d, the above-described drain electrodes which are display elements or units; and 32, an opposing electrode. The drain electrodes 26c, 26d, . . . comprise transparent conduction films made of $In_2O_3$, $SnO_2$ or the like.

The source lines 25a, 25b, . . . comprise a metal such as Al, Cr, Mo, Au, Ag, Pt, Pd, Cu or the like. Insulating films 33a and 33b are formed only over the gates 22a and 22b in this example. An insulating film 34 is formed when so desired. Semiconductors 24c and 24d comprise, for example, CdS, CdSe, Te or amorphous silicon. A spacer 35 is disposed and a liquid crystal layer 36 is interposed.

When used in the TN mode, the surfaces of the insulating layers 34 and 37 are subjected to an orientation process. The orientation process is such that these insulation layers are formed by the oblique vapor deposition process or they have fine grooves extended in a predetermined direction. The orientation can also be accomplished by forming a polymer film over the surface of the insulating layer and rubbing the polymer film.

The display panel as described above can utilize a twisted nematic (TN) display mode. The light rays Io incident to the display panel in accordance with the present invention are plane-polarized by a first plane polarizer 40 and enters the liquid crystal layer 36. When no voltage is applied, the plane of polarization is rotated through 90° and the plane-polarized light reaches a second polarizer 41. The second polarizer has its polarizing plane so oriented that the polarized light can be transmitted therethrough. That is, the first and second polarizers are so disposed that their planes of polarization form right angles relative to each other. Thereafter, the light is reflected by a scattering reflecting plate 42 to return to the incident-light side, but the directions become random because of the scattering reflecting plate and the display presents a bright state. At a portion where a voltage is applied between the upper and lower electrodes, the plane of polarization of the incident light by the first polarizer will not change through a liquid crystal layer and the light reaches the second polarizer, but is prevented from transmitting therethrough so that the dark state is presented.

FIG. 4 shows a relationship between a picture element part which optically change in the manner described above and a shadow part resulting thereby and shows only the arrangement of optical function parts.

In general, the thickness of a liquid crystal layer which optically changes is about ten micrometers and is extremely thin as compared with the substrate material. On the other hand, the two polarizers 40 and 41 which detect this optical change are spaced apart from each other by a distance between the TFT substrate and the opposing electrode plate or substrate and when this is detected by the reflected light of the environmental light, the light scattering plate is disposed further behind the second polarizer.

Obliquely incident light rays Io enter the liquid crystal layers 43a, 43b and 43c at the picture element units in which optical changes occur. The part 43b is the above-described voltage application part. Then, a part indicated by A becomes dark and a dark spot can be discriminated or detected in the background of the scattered light of the reflecting plate 42. Meanwhile, a projection surface of this A to the reflecting plate 42 becomes dark as a shadow. A black spot which can be discriminated or detected becomes a region at which A and B overlap. This means that as compared with the case in which only A is a discriminating unit, excess blur is produced by B.

In the above-described example, when the pitch or spacing (P) of picture elements along a row or column is considered to be of the order of 0.5 mm and when the distance between the position of the liquid crystal layer 43b which shows optical changes and the light scattering plate 42 which forms a reflected image is 0.5 mm and, if the incident light is inclined at 45° relative to the vertical incidence, an optical image of 43b forms the image of a shadow displaced by one whole pitch. In practice, a smaller pitch or a pitch of the order of 0.1 mm is used and, in such a case, when the other conditions are retained, the image of a shadow displaced by a distance of five pitches is produced.

In the present invention, the distance from the liquid crystal layer through the second polarizer to the light scattering reflecting plate is determined to be equal to or less than a display picture element pitch so that the above-described blur of the reflected image can be prevented and the peripheral construction of the opposing substrate for realizing this is given.

The reason why the ratio between the distance (D) between the boundary surface between the opposing electrode substrate and the liquid crystal and the diffused reflection plate and the picture element pitch (P) is determined to be one or less is as follows. Firstly, the fact that the above-described ratio is 1 is the limit at which, in the case of the 45°-incident light, the actual liquid crystal image and the shadow part cannot be completely separated. The second reason is that, in the case of an incident light forming an incident angle of 45° or more, (i) the total reflection of the incident light occurs, (ii) the optical path length of incident light is long as that scattering occurs and no sharp image is produced. (iii) Further, if the angle of incidence is large, the polarization rate is decreased and the image of a shadow is weakened. Because of any of these reasons, the influence of the image of the shadow is reduced.

However, the above-described ratio (D/P) is preferably ½ or less and, in principle, the thinner be better.

The present invention is based on a structure which can realize such conditions. FIGS. 5A and 5B shows structural examples of the opposing substrates as shown in FIG. 3. An opposing electrode 56 contacts the surface of liquid crystal and comprises a transparent conduction film of $In_2O_3$, $SnO_2$ or the like or of a thin film of gold which can transmit light to some extent as in the above-described case. A substrate 55 supports the transparent conduction film 56 and, in the present invention, preferably comprises a transparent polymer film. In one example, monoaxially stretched polyester, polyethersulfone, etc. are used and, in other examples, polycarbonate, polysulfone, urethanated polyole film, cellulose film, etc., may also be used. A polarization film 54 preferably comprises a so-called H film, i.e., a polarization film of elongated polyvinyl alcohol dyed with iodine, supported between the above-described transparent conduction film substrate 55 and a substrate 54. In addition, a polarization film dyed with a dichromatic dye is preferably used. The substrate 53 may be made of the same material as the substrate 55 and preferably comprises a transparent film of cellulose, an acryl resin, etc. An adhesive layer 52 and a reflecting plate 51 of Al or the like whose surface is diffusion reflective are also formed. As described above, by the laminated structure predominantly comprising polymer materials, when the opposing substrate comprising the transparent electrode and the polarizer formed integral is used as the opposing substrate as shown in FIG. 3, there is obtained a structure which can satisfy the positional relationship prescribed by the present invention, the liquid crystal surface and the reflecting surface. That is, the transparent electrode 56 of 0.3 μm in thickness; the substrate 55, from 25 to 100 μm; the polarizer 54, from 4 to 15 μm; the substrate 53, from 25 to 100 μm; and the adhesive layer 52, from 2 to 3 μm to 10 μm can be realized. Therefore, it becomes possible to obtain a distance of 50 to 200 μm from the surface of the electrode 56 in contact with the liquid crystal to the reflecting surface 51.

Therefore, when constructed in the manner described above, the density from the maximum of 20 lines/mm to 5 lines/mm can be realized by a structure for the reflection mode. Of course, there is no adverse effect to a case where a lower resolution is satisfactory. FIG. 5B shows another application example which can be used within a range permitted by the present invention in respect of the relation of the thickness from the liquid crystal interface to the reflection layer in connection with the picture element pitch. A laminated structure shown in this figure comprises a transparent conduction film 56 formed on a polymer film 55, a polarizer 54 sandwiched between the polymer films 55a and 53 and a diffusion reflection plate 51 formed into an integral structure by adhesive layers 52a and 52. By adopting this arrangement, it is possible to combine a transparent conduction film, a polarizer and a reflecting plate which are prepared by separate steps, respectively, to form an integral structure. Thus, each preparation step is not restricted by the functions of the other members.

Figure 6:
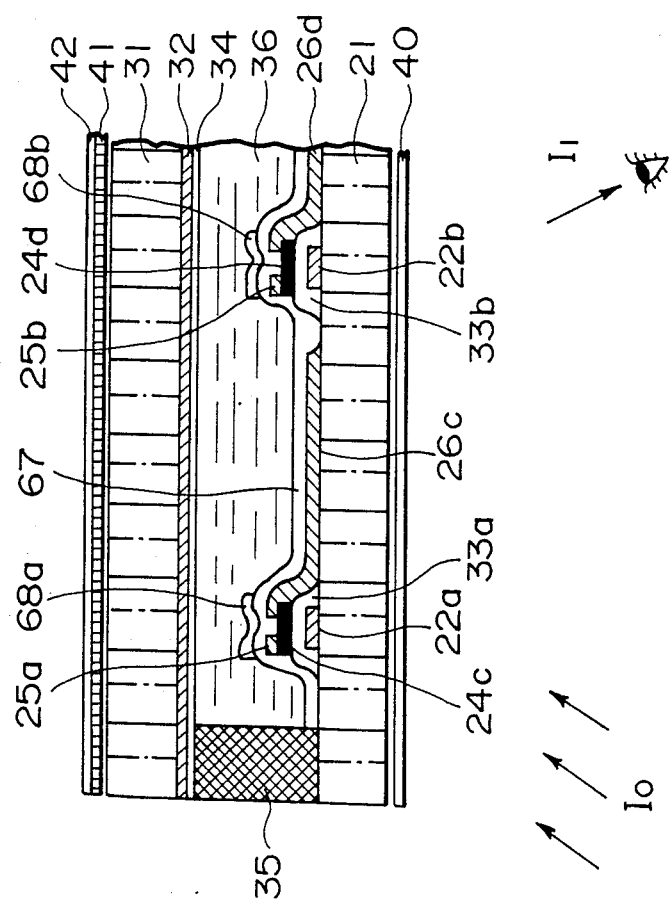

FIG. 6 shows a liquid crystal display panel constructed by adding a scattering reflection film, etc., to the electrode plate as shown in FIG. 2 according to the present invention and then combining it with an opposing substrate. In FIG. 6, reference numerals 31 and 21 denote transparent substrates of glass, plastic or the like; 26b and 26d, the drain electrodes which form the above-described display units; 32, an opposing electrode. The drain electrodes 26c, 26d, etc., comprise transparent conduction films of $In_2O_3$, $SnO_2$ or the like. Insulating films 33a and 33b are formed only over the gates 22a, 22b, etc. An insulating film 34 is formed, if desired. Semiconductors 24c and 24d comprise, for example CdS, CdSe, Te or amorphous silicon. A spacer 35 and a liquid crystal layer 36 are further disposed.

When used in the TN mode, the surfaces of the insulating layers 34 and 67 are subjected to an orientation process. The orientation process is such that the insulating layer itself is deposited by the oblique vacuum deposition process or they have fine grooves extended in a predetermined direction. The orientation can also be accomplished by forming a polymer film over the surface of this insulating layer and rubbing the polymer film.

In this embodiment, a second insulating film 67 is further formed after TFT has been constructed as shown in FIG. 2; and light shielding films 68a and 68b are formed when a semiconductor is photoconductive, comprising an appropriate metal or light-absorbing material (dye or pigment layer). The display panel of the present invention is characterized in that all of electrodes and wiring parts are made of transparent materials, except the light shielding layers 68a, 68b, etc. disposed above and below the semiconductors 24c, 24d, . . .

in order to inhibit their photoconductivity and gate electrodes 22a, 22b, 22c, . . .

Next, a method for driving a display panel using this TFT matrix will be briefly described. For instance, when a driving voltage is applied to the gate lines 22aa and 22ab and when an image signal is applied to the source lines 25a and 25b (only during a time when a signal is applied to a gate line) by scanning, the channels between the sources (25a, 25b) and the drains (26c, 26d) are conducted at selected intersecting points among the intersecting points between these electrodes so that an electric field is produced between the drain electrode and the opposing electrode. As a result, the arrangement of molecules of liquid crystal changes so that a display is effected.

In this display panel, the twisted nematic (TN) mode can be utilized. The light rays Io incident to the display panel in accordance with the present invention are plane-polarized by a first plane polarizer 40, enters the liquid crystal layer and rotate their plane of polarization through 90° when no voltage is applied. The plane-polarized light rays reach a second polarizer 41. The second polarizer has its plane of polarization so oriented that the plane-polarized light rays are transmitted therethrough. That is, the first and second polarizers are disposed at right angles with respect to each other. Thereafter, the light rays are reflected by a scattering reflection plate 42 and returns to the incident light side. But the directions of reflection are random because of the scattering reflecting plate and the display presents a bright state. At a portion at which a voltage is applied between the upper and lower electrodes, the plane of polarization of the incident light polarized by the first polarizer will not change through a liquid crystal layer and reaches the second polarizer. The light rays are not transmitted through the second polarizer and the dark state is presented.

FIG. 7 is a plan view illustrating another example of a TFT construction in accordance with the present invention. FIG. 8A is a sectional view taken along the line A—A of FIG. 7 while FIG. 8B, a sectional view taken along the line B—B of FIG. 7. The arrangement is somewhat different from those shown in FIGS. 2 and 5 and the same reference numerals as those used in the previous figures designate the parts having the same functions.

In these figures, parts which participate in display are 26a, 26b, 26c, . . . and other semiconductor parts and wiring parts are parts which do not participate in display. In such construction, of course, display parts are made of transparent members. When 25a, 25b and 25c or source wiring electrodes and 22aa and 22ab or gate wiring electrodes are made of metals, they do not transmit the light regardless of whether the display part is activated or not activated. As a result, in the case of a cell for the reflection mode as shown in FIG. 6, a shadow is cast on the reflecting plate and a desired light $I_1$ is not emitted as scattered reflected light to a viewer or an optical detector. In other words, a light-interrupting part by this part darkens a picture or image. Meanwhile, when the semiconductor parts are made of a photoconductive material as described hereinbefore, it is desired to shield optically the semiconductor parts. According to the present invention, in order to accomplish this function, light shielding members are given to the semiconductor parts 24a, 24b, 24c, . . ., but other non-display parts comprise transparent materials so that this undesired shadow is reduced. FIG. 8A shows a case where a metal layer 122 is laid only over the TFT part at the gate wiring part 22aa and others are transparent electrodes. FIG. 8B shows an example in which the source wiring electrodes and the drain electrodes (display electrodes 26a, 26b and 26d) are transparent electrodes.

When constructed in the manner described above, only the semiconductor parts which essentially inhibit the transmission of light normally interrupt incident reflected light rays, but it can be ignored as their area is small. Others except picture element electrodes are in the bright state so that it is effective to maintain the picture in a bright state. The construction described above is effective in reducing black noise which is not needed for display when the panel is used an original for electrophotography.

Figure 9:
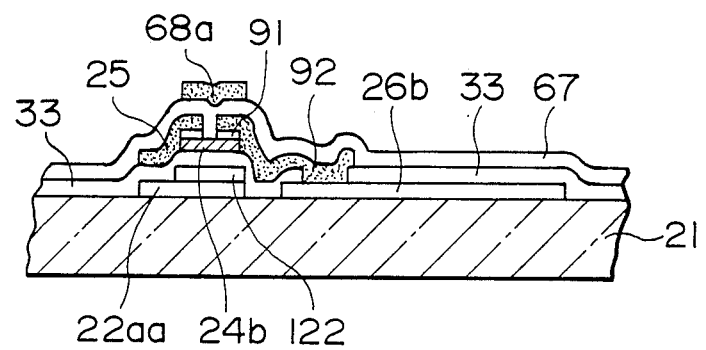
FIG. 9 is a sectional view of a further embodiment of a TFT substrate corresponding to FIG. 8A.

In order to simplify the explanation, FIGS. 6–8 show that the transparent electrodes are made into direct contact with the semiconductor parts 24b, 24d, . . ., but as a modification, it is possible to make the wiring electrode parts and the display electrode parts into contact with the semiconductor parts through n+ thin films doped with impurities or it is possible to connect to the transparent electrode parts partially through a metal. FIG. 9 shows one example of the modification of the type described above. In FIG. 9, reference numeral 21 denotes a TFT substrate; 22aa, a transparent electrode of a gate wiring part; 122, a gate part disposed immediately below a semiconductor part and capable of light shielding; 33, a first insulating layer; 26b, a picture element electrode comprising a transparent electrode; and 24b is electrically connected through an n+ layer 91 to a metal source electrode 25 and a metal drain electrode 92, respectively, and to the picture element electrode 26b through a contact hole (not shown) formed in the insulating layer 33. A second insulating layer 67 is formed over the TFT comprising these component parts and a light shielding metal or light-absorbing layer 68 may be formed as desired over the semiconductor part.

In the case of the embodiment described above, the TFT substrate is disposed on the side of the incident light rays, but it is to be understood that the same effects can be obtained even when a common electrode is disposed on the side of the incident light rays.

Figure 10:
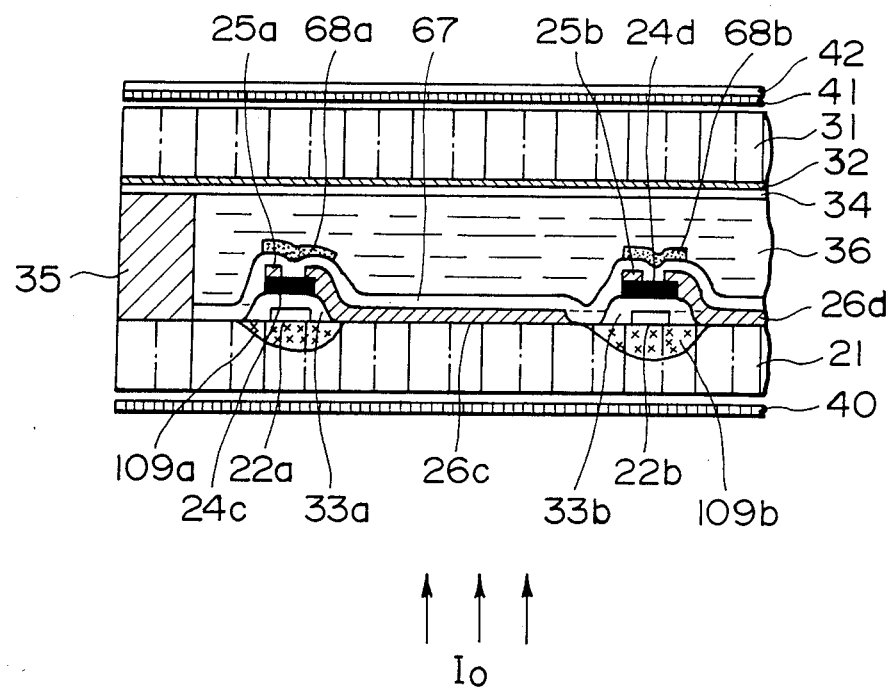

FIG. 10 is a sectional view taken along the line III—III of FIG. 2 and shows another embodiment of the present invention. In this embodiment, gate electrodes 22a and 22b are covered with scattering or diffusion parts 109a and 109b, respectively, which are preferably light-transmissive and disposed on the side of the incident light rays and which have the same light scattering effect as the scattering reflection by the member 42. The light scattering parts are effective not only for removing undesirable effects of the gates electrodes made of a metal or an alloy such as formation of uneasy-to-see picture for a display device and undesirable black spots in copied images but also for removing similar undesirable effects of sources or parts of drains of FETs when they are made of a nontransmissive metal or alloy. The gates, sources and parts of drains of TFTs are covered by a term "wiring part connected to a (picture element-forming) electrode on a substrate". In this regard, the light scattering parts can be formed wider than the gate electrodes themselves in order to enhance the light scattering effect if they are light-transmissive as well as light-scattering or diffusive. For the formation of the scattering part, there may also be used a method for treating the substrate with a scattering treatment and a method for treating the outer surface of the substrate 21 so as to scatter light rays. It is to be understood that the scattering treatment applicable in the present invention is not limited to such methods as described above. The simplest method for forming a scattering part is to selectively roughen with hydrofluoric acid the glass surface below the metal electrode parts disposed on the substrate 21 and can be accomplished by a conventional photolithographic technique which is used in the fabrication of semiconductor devices and which is also used to determine the positions in the succeeding step. From the standpoint of the incident light rays Io, the metal gate electrodes formed on the roughened surface exhibit satisfactory scattering.

Appropriate scattering surfaces can be formed so as to make the scattering characteristic of the scattering parts 109a, 109b, . . . commensurate with the characteristic of the scattering reflection plate 42. For instance, when the glass surface is roughened, this can be arbitrarily set by a concentration of hydrofluoric acid, an etching time and a temperature.

The above-described light scattering parts 109a and 109b shown in FIG. 10 can also be obtained by the local crystallization of the substrate 21. Local crystallization can be accomplished by heating and cooling this part and this can be accomplished by a laser beam. In addition, there is a method for injecting impurities into this part from the exterior, thereby imparting thereto the light scattering capability. For instance, the ion injection process can be effectively used. Furthermore, it is possible to embed scattering particles in this part. A material having an index of refraction different from that of a substrate material can be used as scattering particles. Moreover, it is possible to form light scattering parts on the surface opposite to the surface, upon which TFTs are formed, of the substrate by printing, etc. or by adding an additional light scattering film or plate. This method is effective only when the substrate 21 is thin relative to the pitch of display picture elements.

So far, the TFT substrate has been described as being disposed on the side of the incident light rays, but it is to be understood that the same effects can be obtained by providing the electrode members with light scattering surfaces when a common electrode side is disposed on the side of the incident light rays.

As described above, according to the present invention, high scattering parts are provided on the side of the incident light rays of metal electrode formation parts of TFTs so that a liquid crystal image forming apparatus providing a display panel with an easy-to-see picture as well as an original for copying free of unnecessary black points can be provided.

What is claimed is:

1. In an image forming apparatus of the type comprising a liquid crystal panel having a first substrate having first electrodes thereon, a liquid crystal layer, a second substrate having a second electrode, polarizing means and light-scattering reflection means; a light source for emitting light toward said liquid crystal from the side of said first substrate; means for forming an electrostatic light image corresponding to the light rays reflected from said liquid crystal panel; and developing means; the improvement wherein
picture elements are arranged in a row or column with a spacing (P) between adjacent picture elements, each picture element being formed at a portion where said first and second electrodes face each other through the liquid crystal layer, said gap (P) being equal to or larger than the distance (D) from the interface between said second electrode and said liquid crystal layer to the scattering reflection surface of said light-scattering reflection means.

2. An image forming apparatus according to claim 1 wherein said first electrodes are plural in number and arranged in a matrix, and a thin film transistor is connected to each of said first electrodes.

3. An image forming apparatus according to claim 2 wherein the thin film transistors are disposed on said first substrate.

4. An image forming apparatus according to claim 2 wherein the semiconductor part of each of said thin film transistors comprises amorphous silicon.

5. An image forming apparatus according to claim 1 wherein said polarizing means comprises two polarizers disposed in a cross-nicol relationship.

6. An image forming apparatus according to claim 1 wherein said distance D is within a range of from 50 to 200 micrometers; and the number of picture elements per millimeter is between 20 and 5.

7. An image forming apparatus according to claim 1 wherein the spacing P of the picture elements and the distance D satisfy the relationship of $D/P < \frac{1}{2}$.

8. In an image forming apparatus of the type comprising a liquid crystal panel having a first substrate having first electrodes thereon, a liquid crystal layer, a second substrate having a second electrode, polarizing means and light-scattering reflection means; a light source for emitting light toward said liquid crystal from the side of said first substrate; means for forming an electrostatic light image corresponding to the light rays reflected from said liquid crystal panel; and developing means: the improvement wherein
said first electrodes are plural in number and arranged in a matrix, each first electrode being connected to a thin film transistor, and the electrodes formed on the first substrate provided with the thin film transistors except for those formed on the semiconductors of the thin film transistors are formed of transparent electrodes.

9. An image forming apparatus according to claim 8 wherein the terminals of each of said thin film transistors are made of a metal or an alloy.

10. An image forming apparatus according to claim 8 wherein the semiconductor of each of said thin film transistors comprises amorphous silicon.

11. An image forming apparatus according to claim 8 wherein said polarizing means comprises two polarizers disposed in a cross-nicol relationship.

12. In an image forming apparatus of the type comprising a liquid crystal panel having a first substrate having first electrodes thereon, a liquid crystal layer, a second substrate having a second electrode, polarizing means and light-scattering reflection means; a light source for emitting light toward said liquid crystal from the side of said first substrate; means for forming an electrostatic light image corresponding to the light rays reflected from said liquid crystal panel; and developing means; the improvement wherein
picture elements are arranged in a row or column, each picture element being formed at a portion where said first and second electrodes face each other through the liquid crystal layer, said first electrodes or second electrode at the picture elements is connected to an opaque wiring part comprising a metal or an alloy, and light-transmissive scattering means is provided for scattering a shadow formed by the opaque wiring part.

13. An image forming apparatus according to claim 12 wherein said light-transmissive scattering means is disposed at a position corresponding to said opaque wiring part of said first substrate.

14. An image forming apparatus according to claim 12 wherein said first electrodes are plural in number and arranged in a matrix, and a thin film transistor is connected to each of said first electrodes.

15. An image forming apparatus according to claim 14 wherein the thin film transistors are formed on said first substrate.

16. An image forming apparatus according to claim 14 wherein the semiconductor part of said thin film transistor comprises amorphous silicon.

17. An image forming apparatus according to claim 14 wherein said polarizing means comprises two polarizers disposed in a cross-nicol relationship.

* * * * *

UNITED STATES PATENT AND TRADEMARK OFFICE
CERTIFICATE OF CORRECTION

PATENT NO. : 4,671,642                 Page 1 of 2

DATED : June 9, 1987

INVENTOR(S) : YUKITOSHI OHKUBO, ET AL.

It is certified that error appears in the above-identified patent and that said Letters Patent is hereby corrected as shown below:

COLUMN 1

Line 8,     "formed" should read --forming--.

COLUMN 2

Line 3,     "means picture" should read --means; wherein picture--.

Line 59,    "incontact" should read --in contact--.

COLUMN 4

Line 24,    "plahe" should read --plane--.
    Line 25,    "enters" should read --enter--.
    Line 44,    "change" should read --changes--.

COLUMN 5

Line 41,    "be" should read --the--.
    Line 43,    "shows" should read --show--.

COLUMN 7

Line 19,    "enters" should read --enter--.
    Line 28,    "returns" should read --return--.

UNITED STATES PATENT AND TRADEMARK OFFICE
CERTIFICATE OF CORRECTION

PATENT NO. : 4,671,642
DATED : June 9, 1987
INVENTOR(S) : YUKITOSHI OHKUBO, ET AL.

It is certified that error appears in the above-identified patent and that said Letters Patent is hereby corrected as shown below:

COLUMN 8

Line 15, "used an" should read --used as an--.
    Line 55, "gates" should read --gate--.

Signed and Sealed this

Twenty-sixth Day of January, 1988

Attest:

DONALD J. QUIGG

Attesting Officer      Commissioner of Patents and Trademarks